UNITED STATES PATENT OFFICE.

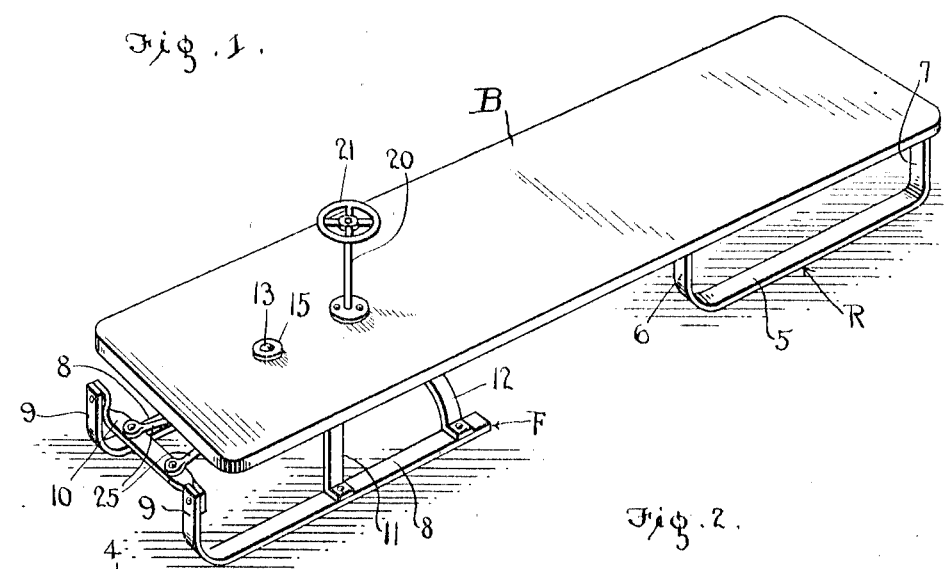

JOHN ANDERSON, OF LINCOLN, KANSAS.

SLED.

1,001,498.  Specification of Letters Patent.  Patented Aug. 22, 1911.

Application filed May 1, 1911.  Serial No. 624,409.

*To all whom it may concern:*

Be it known that I, JOHN ANDERSON, a citizen of the United States, residing at Lincoln, in the county of Lincoln and State of Kansas, have invented certain new and useful Improvements in Sleds; and I do declare the following to be a full, clear, and exact description of the invention, such as will enable others skilled in the art to which it appertains to make and use the same.

This invention is a sled designed more particularly for coasting, and the object of the same is to provide improved means for steering the sled much as an automobile is steered. This object is accomplished by the construction hereinafter more fully described and claimed, and as shown in the drawings wherein—

Figure 1 is a perspective view of this sled complete. Fig. 2 is a bottom plan view thereof showing the front or steering sled or truck as turned to one side. Fig. 3 is a central vertical longitudinal section through the front portion of the sled. Fig. 4 is a cross section on the line 4—4 of Fig. 2.

In the drawings the letter B designates broadly the board representing the body portion of this sled, F is the front or steering truck or sled proper, and R is the rear or trailing truck or sled.

While I do not limit myself to the exact construction of the sleds proper, it may be well to make them as shown in the drawings of strap iron whereof the runners 5 of the rear sled are turned up at their ends 6 and 7 and riveted or bolted beneath the board B as shown. The runners 8 of the front sled F are turned up at their forward ends 9 and connected by a cross bar 10, and along the body of the runners 8 are knees 11 and 12 whereof the former is pivotally mounted on a king bolt 13 through the board B, and preferably provided with wear plates or washers 15 to prevent friction. If desired also, sections of a fifth-wheel 16 may be secured to the bottom of the board and will rest upon this knee to assist in preventing friction and avoiding tilting of the board. The rear most knee 12 is preferably curved upward or arched as shown but rises not quite so high as the foremost knee.

The steering mechanism comprises an upright shaft 20 journaled through the board in any suitable manner and having a hand wheel 21 at its upper end and a crank 22 at its lower end as shown.

Connected with and extending to the rear from the cross bar 10, and passing beneath the intermediate knee 11 and projecting toward the rearmost knee 12, is a slotted member 25 in which the crank moves as best seen in Fig. 2. Hence when this wheel is turned in either direction the crank (which, as shown stands in rear of the king-bolt) moves within the slot and causes the front sled F to turn upon its pivot.

Thus it will be seen that I have devised a coasting sled for youths wherein the steering device simulates that employed upon an automobile, and wherein also the centrally disposed knee of the front sled F is connected with the board by a king-bolt and possibly also by portions of a fifth-wheel as described.

The parts may be of any desired sizes, shapes, proportions and materials.

What is claimed as new is:

In a coasting sled, the combination with the board, a trailing sled beneath its rear end, an upright shaft journaled through the board and having a crank at its lower end, and a wheel at the upper end of the shaft; of a steering sled beneath the front end of the board including an intermediate knee pivoted to said board, the runners turned up at their front ends, a cross bar connecting them, a rear knee arched over their rear ends, and a slotted member connected with said cross bar and passing below the intermediate knee toward the rear knee and in whose slot plays the crank of said shaft.

In testimony whereof I have hereunto set my hand in presence of two subscribing witnesses.

JOHN ANDERSON.

Witnesses:
CARL W. SHAVER,
JOHN S. RICH.